United States Patent
Matsufuji et al.

(10) Patent No.: US 6,786,317 B2
(45) Date of Patent: Sep. 7, 2004

(54) HYDRAULIC CLUTCH ASSEMBLY

(75) Inventors: Mizuya Matsufuji, Amagaski (JP); Takumi Fujita, Amagaski (JP)

(73) Assignee: Kanzaki Kokyukoki Mfg. Co. Ltd., Amagasaki (JP)

( * ) Notice: Subject to any disclaimer, the term of this patent is extended or adjusted under 35 U.S.C. 154(b) by 0 days.

(21) Appl. No.: 10/230,632

(22) Filed: Aug. 29, 2002

(65) Prior Publication Data

US 2003/0042104 A1 Mar. 6, 2003

(30) Foreign Application Priority Data

Sep. 4, 2001 (JP) ........................................ 2001-266778

(51) Int. Cl.$^7$ ..................... F16D 25/0638; F16D 25/06; B60K 17/02
(52) U.S. Cl. ................. 192/87.15; 192/48.91; 192/70.12; 192/70.19; 192/91 A; 192/113.35
(58) Field of Search .......................... 192/87.17, 87.16, 192/87.15, 91 A, 113.35, 70.12, 70.19, 48.91

(56) References Cited

U.S. PATENT DOCUMENTS

| | | | | |
|---|---|---|---|---|
| 2,743,626 A | * | 5/1956 | Schjolin ................. | 192/48.91 |
| 3,595,353 A | * | 7/1971 | Beneke ................... | 192/85 CA |
| 3,805,632 A | * | 4/1974 | Prokop et al. .......... | 192/87.17 |
| 4,270,647 A | * | 6/1981 | Leber ..................... | 192/113.35 |
| 4,440,279 A | * | 4/1984 | Schreiner ................ | 192/91 A |
| 4,460,075 A | * | 7/1984 | Sommer ................... | 192/87.16 |
| 4,528,872 A | * | 7/1985 | Umemoto et al. .......... | 475/142 |
| 4,531,421 A | | 7/1985 | Vieth | |
| 4,775,041 A | * | 10/1988 | Boffelli ................. | 192/85 CA |
| 5,190,129 A | * | 3/1993 | Sommer ................... | 192/91 A |
| 5,667,045 A | * | 9/1997 | Cummings, III ......... | 192/70.12 |
| 6,044,720 A | * | 4/2000 | Matsufuji .................... | 74/331 |
| 6,360,623 B1 | | 3/2002 | Matsufuji | |

FOREIGN PATENT DOCUMENTS

JP    2000-352446    12/2000

* cited by examiner

Primary Examiner—Rodney H. Bonck

(57) ABSTRACT

A hydraulic clutch assembly is equipped with a spring-drive hydraulic clutch, which includes a gear rotatably mounted on a transmission shaft and a clutch cylinder fixedly mounted on the transmission shaft, first and second friction elements respectively supported on the gear and the clutch cylinder in such a manner as to be slidable along an axis of the clutch (hereinafter sometimes referred to a clutch axis) and relatively non-rotatable thereto, a pressure disk disposed opposite to the friction elements, and a spring for moving the pressure disk towards the friction elements to bring the first friction element into engagement with the second friction element, in which the pressure disk is moved away from the friction elements by an effect of hydraulic pressure, thereby withdrawing the friction elements from engagement with each other.

8 Claims, 12 Drawing Sheets

HYDRAULIC CLUTCH ASSEMBLY

BACKGROUND OF THE INVENTION

Field of the Invention

The present invention relates to a hydraulic clutch assembly, and more particularly to a hydraulic clutch assembly equipped with a spring-drive hydraulic clutch, which includes a gear rotatably mounted on a transmission shaft and a clutch cylinder fixedly mounted on the transmission shaft, first and second friction elements respectively supported on the gear and the clutch cylinder in such a manner as to be slidable along an axis of the clutch (hereinafter sometimes referred to a clutch axis) and relatively non-rotatable thereto, a pressure disk disposed opposite to the friction elements, and a spring for moving the pressure disk towards the friction elements to bring the first friction element into engagement with the second friction element, in which the pressure disk is moved away from the friction elements by an effect of hydraulic pressure, thereby withdrawing the friction elements from engagement with each other.

In a vehicle with a transmission equipped with the spring-drive hydraulic clutch, the hydraulic clutch is inevitably held in an engaged state when no hydraulic pressure is applied thereto. Accordingly, when an engine of the vehicle has been accidentally stopped, it can be restarted by a so-called pull-start by manually moving the vehicle.

In a vehicle equipped with both the spring-drive hydraulic clutch and a hydraulic-drive hydraulic clutch, it is enough to provide the transmission shaft with a single operational fluid passage for both the hydraulic clutches. As a result, a structure for feeding working fluid to both hydraulic clutches can be simplified.

The hydraulic clutch assembly of the above type having the spring-drive clutch is known for example in Japanese Patent Application Laid-open No. 2000-352446.

However, the spring-drive hydraulic clutch assembly of the conventional type as described in the above-cited publication poses problems as described below.

The spring-drive hydraulic clutch assembly of the conventional type includes a gear rotatably mounted on a transmission shaft, a clutch cylinder fixedly mounted on the transmission shaft, first and second friction elements respectively supported on the gear and the clutch cylinder in such a manner as to be slidable along the clutch axis and relatively non-rotatable thereto, a pressure disk disposed opposite to the friction elements, a spring for pressing the pressure disk towards the friction elements, a hydraulic piston for pressing the pressure disk away from the friction elements against biasing force of the spring upon receiving an effect of hydraulic pressure, and a hydraulic cylinder enclosing the hydraulic piston.

Specifically, the hydraulic cylinder is of an annular shape, which is integrally formed on the clutch cylinder and radially outwardly extending therefrom so as to cover the clutch cylinder. A radially outward portion of the pressure disk protrudes outwardly through the clutch cylinder, while the hydraulic piston is arranged so as to abut against the protrusion of the pressure disk. When the pressure disk is shifted away from the friction elements by the actuation of the hydraulic piston, the clutch is released from an engaged state.

Thus, the conventional spring-drive hydraulic clutch is disadvantageous in the fact that its clutch engagement release mechanism is of a complicated structure and the hydraulic cylinder is positioned on the radially outward side of the clutch cylinder, hence inviting increase in the entire size of the hydraulic cylinder.

It is an object of the present invention to provide a new hydraulic clutch assembly, which is of a relatively simple structure and includes a clutch engagement releasing mechanism that is capable of being placed substantially within an outer diameter of the clutch cylinder.

It is another object of the present invention to provide a new hydraulic clutch assembly that enables a hydraulic-drive clutch to be aligned with a spring-drive hydraulic clutch with a relatively simple structure.

It is still another object of the present invention to provide a clutch assembly that has an improved lubricant feeding structure for a spring-drive hydraulic clutch and a hydraulic-drive hydraulic clutch aligned therewith, aiming at effectively utilizing lubricant.

SUMMARY OF THE INVENTION

According to the present invention, there is provided a hydraulic clutch assembly equipped with a spring-drive hydraulic clutch, the hydraulic clutch including: a gear rotatably mounted on a transmission shaft and a clutch cylinder fixedly mounted on the transmission shaft; a first group of friction elements respectively and relatively non-rotatably supported on the gear and the clutch cylinder in such a manner as to be slidable along an axis of the clutch; a pressure disk disposed opposite to the first group of friction elements; a spring for moving the pressure disk towards the first group of friction elements to bring the friction elements into engagement with each other; a piston disposed in such a manner as to be slidable along the axis of the clutch on the opposite side of the pressure disk with the first group of friction elements therebetween, thereby forming a hydraulic fluid chamber within the clutch cylinder; an operation disk disposed in such a manner as to be slidable along the axis of the clutch between the piston and the first group of friction elements; and an interlocking rod extending along the axis of the clutch for interlocking the operation disk with the pressure disk in such a manner as not to be relatively movable with respect to each other. In this arrangement, the pressure disk is moved away from the first group of friction elements through the operation disk and the interlocking rod by an effect of hydraulic pressure acting on the piston, so that the friction elements are released from engagement with each other.

In the clutch assembly having the above arrangement, the clutch releasing mechanism of the spring-drive hydraulic clutch is constituted not by installing the hydraulic cylinder, which is integrally formed with the clutch cylinder, on the clutch cylinder, but by the operation disk, the piston and the interlocking rod, all of which can be placed within the outer diameter of the clutch cylinder. As a result of the omission of the hydraulic cylinder, a simplified structure can be achieved, and the outer diameter of the hydraulic clutch can be prevented from exceeding the outer diameter of the clutch cylinder, thereby achieving the reduced size of the hydraulic clutch assembly.

In a preferable aspect of the hydraulic clutch assembly, the clutch cylinder forms cutaway portions in an outer circumferential wall thereof, the cutaway portions extending along the axis of the clutch; the pressure disk and the operation disk respectively have protrusions which project into the cutaway portions of the clutch cylinder; and the interlocking rod interlocks the protrusion of the pressure disk with the protrusion of the operation disk.

According to the above arrangement, the interlocking between the operation disk and the pressure disk by means of the interlocking rod can be achieved in remarkably easy manner. Also, at least a part of the interlocking rod can be positioned in the cutaway portion. This enables the outer diameter of the entire hydraulic clutch to be efficiently reduced.

In a more preferable aspect, the protrusions are engaging protrusions to be fitted in the cutaway portions so as to enable the pressure disk and the operation disk to be relatively non-rotatable with respect to the clutch cylinder.

According to the above arrangement, with a simple construction, the operation disk and pressure disk can be securely brought into a non-rotatable state with respect to the clutch cylinder. As a result, engaging force effected by the hydraulic clutch can be increased.

In a more preferable aspect, the second friction element supported on the clutch cylinder has engagement protrusions formed on an outer circumference thereof and being respectively fitted into the cutaway portions so as to be relatively non-rotatable with respect to the clutch cylinder.

According to the above arrangement, it is possible to simplify the connecting structure between the clutch cylinder and the second friction element, which is supported on the clutch cylinder in such a manner as to be sidable along the axis of the clutch and relatively rotatable thereto.

That is, for example, by forming spline teeth on the inner circumference of the clutch cylinder and the outer circumference of the second friction element to be meshed with each other, it is possible to obtain the connection structure between the clutch cylinder and the second friction element. Although this spline teeth arrangement can achieve the connection structure, the above preferable aspect can achieve a simpler structure than this spline teeth arrangement.

In a still preferable aspect, the hydraulic clutch assembly further includes a hydraulic-drive hydraulic clutch. The hydraulic-drive hydraulic clutch includes: a second gear rotatably mounted on the transmission shaft so as to be positioned opposite to the gear with the clutch cylinder therebetween; a second group of friction elements, the first and second friction elements respectively supported on the second gear and the clutch cylinder in such a manner as to be sidable along the axis of the clutch and relatively non-rotatable thereto; a second piston disposed opposite to the piston with a partition wall therebetween, the partition wall formed in the clutch cylinder, the second piston being slidable along the axis of the clutch; and a second spring for biasing the second piston away from the second group of the friction elements. In this arrangement, the friction elements can be brought into an engaged state with each other by having hydraulic pressure acting on the second piston, and the transmission shaft forms a single operational fluid passage for feeding and discharging therethrough pressurized fluid to the hydraulic-drive hydraulic clutch and the spring-drive hydraulic clutch, respectively.

In a more preferable aspect, the single operational fluid passage is communicated with any one of hydraulic fluid chambers of the spring-drive hydraulic clutch and the hydraulic-drive hydraulic clutch; and the partition wall of the clutch cylinder forms therein a fluid passage hole for communication between both the hydraulic fluid chambers.

In a still more preferable aspect, the transmission shaft forms therein a single lubricant passage for feeding lubricant to the first group of friction elements in the spring-drive hydraulic clutch and the second group of friction elements of the hydraulic-drive hydraulic clutch, respectively. The piston and second piston respectively have inner circumferences, which form first and second hydraulic fluid passages for communication between the single lubricant passage and the inside of the clutch cylinder. The first and second hydraulic fluid passages respectively define openings communicated with the single lubricant passage. The openings is widened when the first and second pistons are shifted to positions respectively bringing the first group of friction elements into the engaged state, and the second group of friction elements into the engaged state.

According to the above arrangement, it is possible to feed a large amount of lubricant to the hydraulic clutch in the engaged state, while reducing the feeding rate of lubricant or feeding no lubricant to the hydraulic clutch in the disengaged state. As a result, the hydraulic pump can have a reduced volume and achieve reduced loss of the horsepower thereof.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

The description will be made for a preferred embodiment of the present invention with reference to the accompanied drawings.

Figure 1:
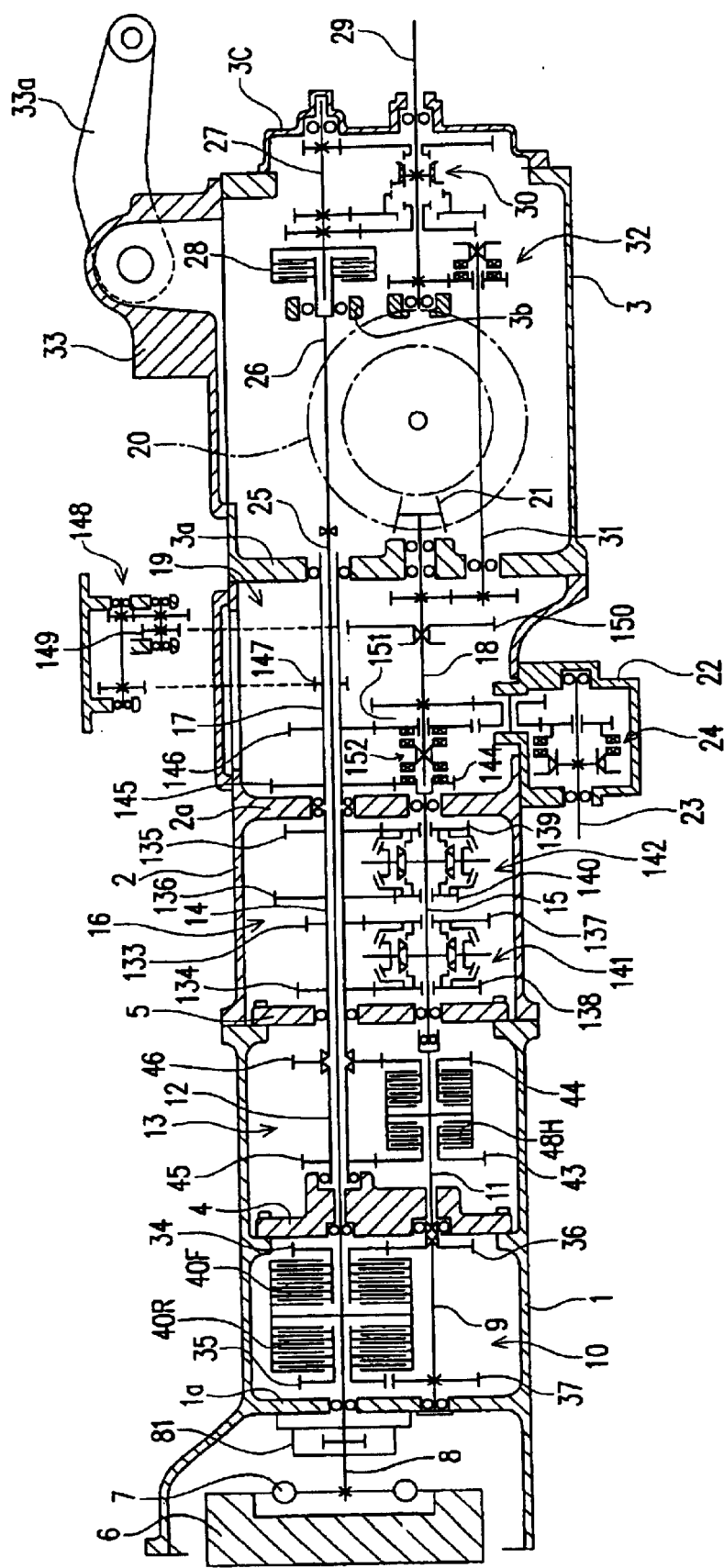
FIG. 1 is a structural view illustrating a power transmission mechanism of a tractor equipped with a spring-drive hydraulic clutch assembly according to one embodiment of the present invention.

FIG. 1 illustrates a power transmission mechanism of a tractor equipped with a spring-drive hydraulic clutch assembly according to one embodiment of the present invention.

The tractor includes front housing 1, intermediate housing 2 and rear housing 3, which are connected to each other along a vehicle longitudinal direction (hereinafter sometimes simply referred to "longitudinal direction"). The front housing 1, intermediate housing 2 and rear housing 3 together make up at least a part of a frame of the tractor. The front housing 1 has support wall 1a integrally formed therewith at an intermediate position along the longitudinal direction. The front housing 1 also has first bearing frame member 4 supportedly mounted therein at a position, along which a rear section of the front housing 1, which is rearwardly positioned than the support wall 1a, is divided into two substantially equal parts, and second bearing frame member 5 supportedly mounted to a rear end of the front housing 1. The second bearing frame 5 may be supportedly mounted to a front end of the intermediate housing 2. The intermediate housing 2 has support wall 2a integrally formed therewith at an intermediate position along the longitudinal direction. The rear housing 3 has front wall 3a, support wall 3b at an intermediate position along the longitudinal direction, and rear lid 3c closing an opening at a rear end of the rear housing. Motive power shaft 8, which is coupled via buffer joint 7 with engine flywheel 6 positioned at a front-most end portion of the front housing, is supported within the front housing 1.

A running power transmission mechanism in the tractor includes forward/rearward movement switching unit 10, high/low speed switching unit 13, main-speed-change unit 16 and sub-speed-change unit 19. These units are connected to each other in tandem.

The forward/rearward movement switching unit 10 is disposed between the support wall 1a and the first bearing frame 4, and between the motive power shaft 8 and driven shaft 9 disposed parallel thereto (i.e., at a lower side in the illustrated arrangement).

The high/low speed switching unit 13 is disposed between the first bearing frame 4 and the second bearing frame 5, and between driving shaft 11 coaxially aligned and coupled with the driven shaft 9 and hollow driven shaft 12 coaxially aligned with the motive power shaft 8.

The main-speed-change unit 16 is disposed between hollow driving shaft 14 coaxially aligned and coupled with the driven shaft 12 and driven shaft 15 coaxially aligned with the driving shaft 11 within the front half section of the intermediate housing 2.

The sub-speed-change unit 19 is disposed between hollow counter shaft 17 operatively connected with the driven shaft 15 and propeller shaft 18 coaxially aligned with the driven shaft 15 within the rear half section of the intermediate housing 2. The hollow counter shaft 17 is disposed coaxial with the driving shaft 14.

The propeller shaft 18 has a rear end extending into the rear housing 3 and provided with small bevel gear 21, which is meshed with input bevel gear 20 of a differential gear unit for right and left rear wheels (not shown).

The intermediate housing 2 has a bottom portion on which front wheel driving power take-off casing 22 is mounted. The front wheel driving power take-off casing 22 supports front wheel driving power take-off shaft 23, which is connected with the propeller shaft 18 via front wheel driving clutch 24.

A PTO power transmission mechanism in the tractor includes transmission shaft 25 having its front end coupled with the motive power shaft 8 and extending through the hollow driven shaft 12, hollow driving shaft 14 and hollow counter shaft 17, transmission shaft 26 disposed within the rear housing 3 so as to be coupled with a rear end of the transmission shaft 25, transmission shaft 27 coaxially aligned with the transmission shaft 26, PTO clutch 28 disposed between the transmission shaft 26 and the transmission shaft 27, PTO shaft 29 disposed parallel to the transmission shaft 27 (i.e. at a lower side in the illustrated embodiment) and having a rear end rearwardly extending through the rear lid 3c, and PTO speed change unit 30 having three speed stages and disposed between the transmission shaft 27 and the PTO shaft 29.

The PTO power transmission mechanism also includes transmission shaft 31 operatively connected with the propeller shaft 18, and grand PTO clutch 32 disposed between the transmission shaft 31 and the PTO shaft 29.

The rear housing 3 also has an upper side on which hydraulic lift unit 33 equipped with right and left lift arms 33a for lifting a working device (not shown) driven by the PTO shaft 29 is mounted.

Figure 2:
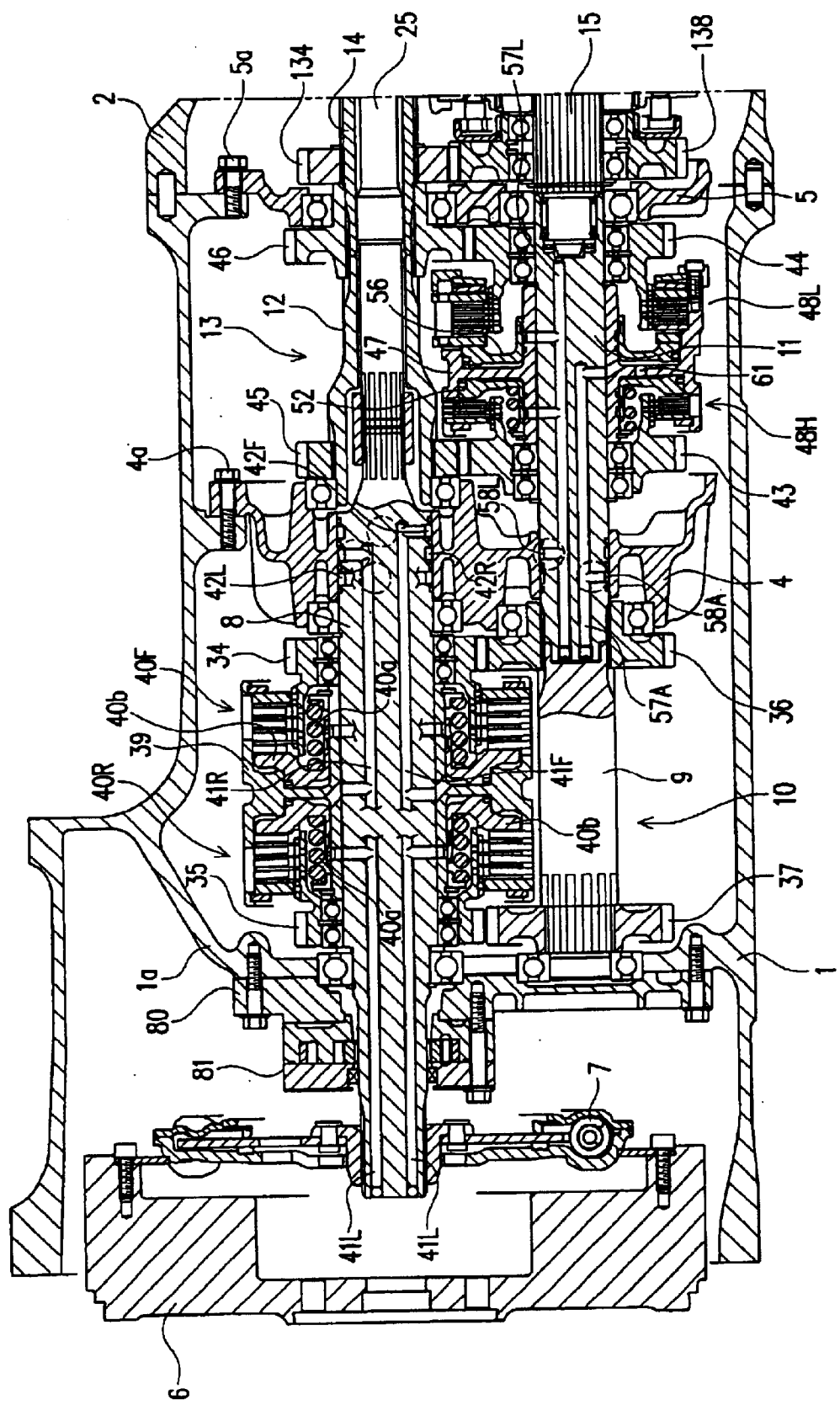
FIG. 2 is a side view of a front housing of the tractor as illustrated in FIG. 1 in longitudinal cross section.

FIG. 2 illustrates a power transmission mechanism in the front housing 1. The first and second bearing frames 4, 5 are detachably mounted to bosses formed on an inner circumference of the front housing 1 via bolts 4a, 5a.

Figure 9:
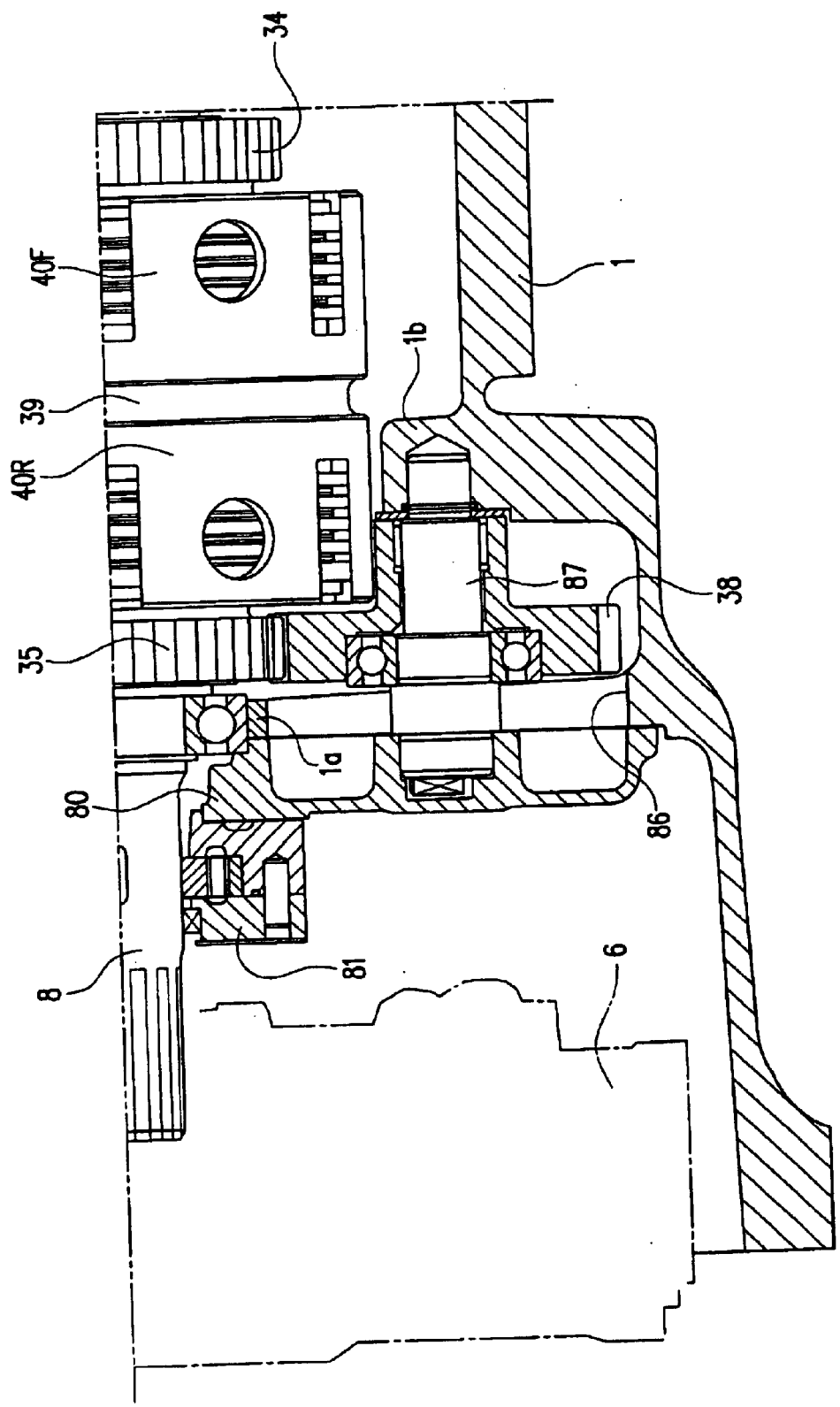
FIG. 9 is a plan view in longitudinal cross section, illustrating a portion of the front housing.

The forward/rearward movement switching unit 10 includes two gears 34, 35 rotatably mounted on the motive power shaft 8, and two gears 36, 37 fixedly mounted on the driven shaft 9. The gears 34, 36 are directly meshed with each other, while the gears 35, 37 are meshed with each other via intermediate idler gear 39 (FIG. 9).

The forward/rearward movement switching unit 10 further includes hydraulic clutch 40F for forward movement and hydraulic clutch 40R for rearward movement, which are fixedly mounted on the motive power shaft 8 between the gears 34, 35. The hydraulic clutches 40F and 40R have common clutch cylinder 39.

The hydraulic clutches 40F, 40R each are of a conventional multi-disk friction clutch that includes a first group of friction elements, which are relatively non-rotatably and slidably coupled with bosses of the gears 34, 35, a second group of friction elements, which are alternately arranged with the first group of friction elements, and relatively non-rotatably and slidably supported on the clutch cylinder 39, piston 40b disposed opposite to these groups of friction elements, and return spring 40a for biasing the piston 40b away from the groups of friction elements. The clutch of this type achieves clutch engagement by means of hydraulic pressure, which moves the piston 40b towards the friction elements. With this arrangement, by operatively connecting the gear 34 with the motive power shaft 8 while holding the hydraulic clutch 40F for forward movement in the clutch engaged state, the driven shaft 9 is rotated in a direction enabling the vehicle to move forward. Contrary, by operatively connecting the gear 35 with the motive power shaft 8 while holding the hydraulic clutch 40R for rear movement in the clutch engaged state, the driven shaft 9 is rotated in a direction enabling the vehicle to move rearward.

The motive power shaft 8 forms therein operational fluid passage 41F for the hydraulic clutch 40F, operational fluid passage 41R for the hydraulic clutch 40R, and two lubricant passages 41L for the hydraulic clutches 40F, 40R. These passages 41F, 41R, 41L are formed by boring the motive power shaft 8 through its front end surface. Bored ends of these passages are covered by plug members. These passages 41F, 41R, 41L are connected with fluid passages on the fixed side of the clutch assembly by fluid-passage rotary joints 42F, 42R, 42L, each of which is made up of an annular recess formed on the outer circumference of the motive power shaft 8 and the bearing frame member 4, which seals the annular recess. The two lubricant passages 41L are formed in this embodiment on the assumption that a single passage which can be formed with a specific boring tool in a machining site will not be so large as to sufficiently feed lubricant. It is a matter of course that, if a boring tool can form a passage with a sufficient diameter, a single lubricant passage will be enough for this function.

As illustrated in FIG. 2, the driving shaft 11 is coupled with the driven shaft 9 by means of a boss of the gear 36. The high/low speed switching unit 13 includes two gears 43, 44, which are rotatably mounted on the driving shaft 11, and two gears 45, 46 fixedly mounted on the driven shaft 12, in which the gears 43, 44 are respectively meshed with the gears 45, 46.

The high/low speed switching unit 13 also includes high-speed hydraulic clutch 48H and low-speed hydraulic clutch 48L, which are disposed on the driving shaft 11 between the gears 43, 44. The high-speed hydraulic clutch 48H and the low-speed hydraulic clutch 48L have common clutch cylinder 47 fixedly mounted on the driving shaft 11.

Figure 3:
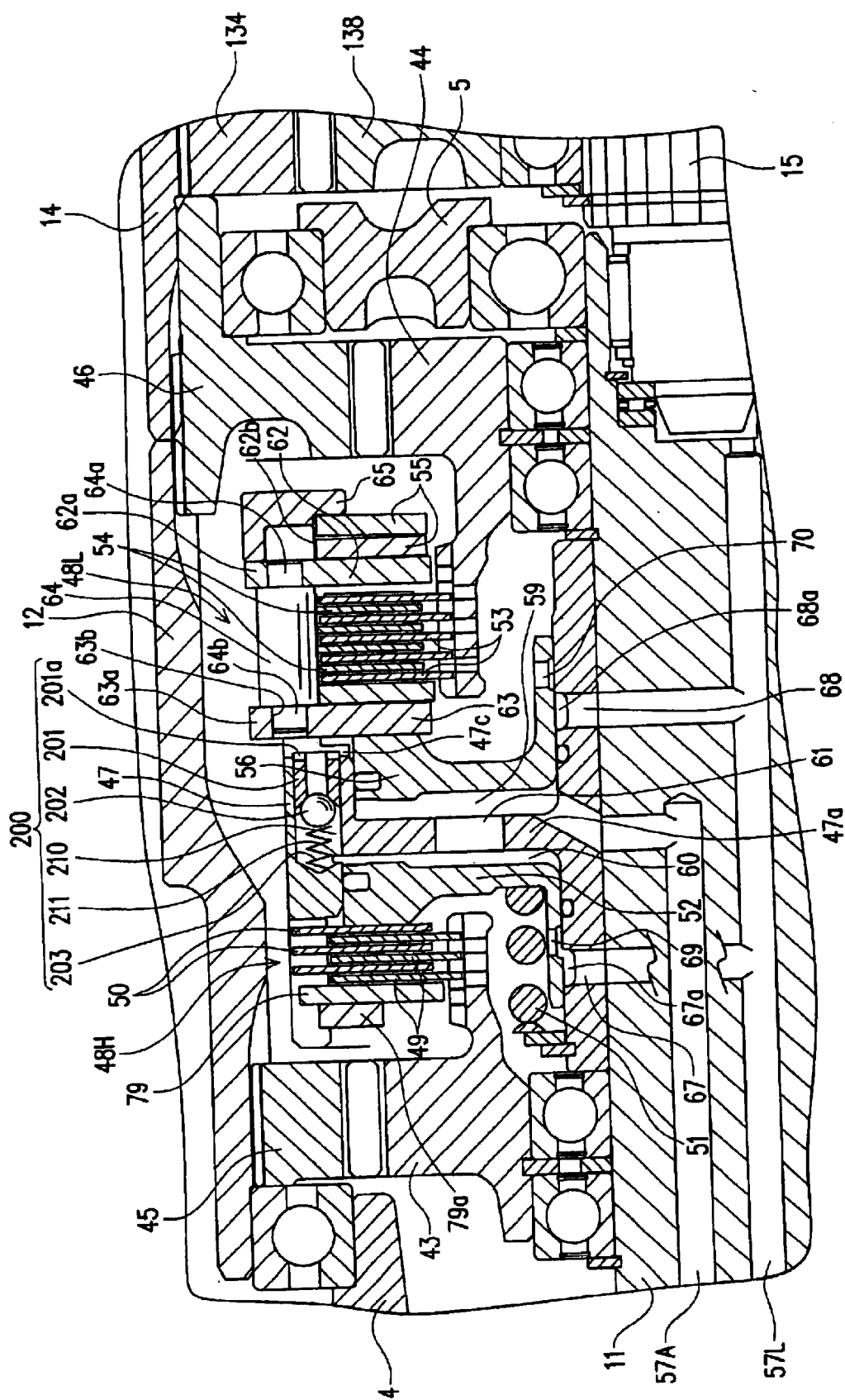
FIG. 3 is an enlarged view of the front housing of the tractor of FIG. 1 in longitudinal cross section, illustrating a clutch released state of the spring-drive hydraulic clutch assembly.
Figure 4:
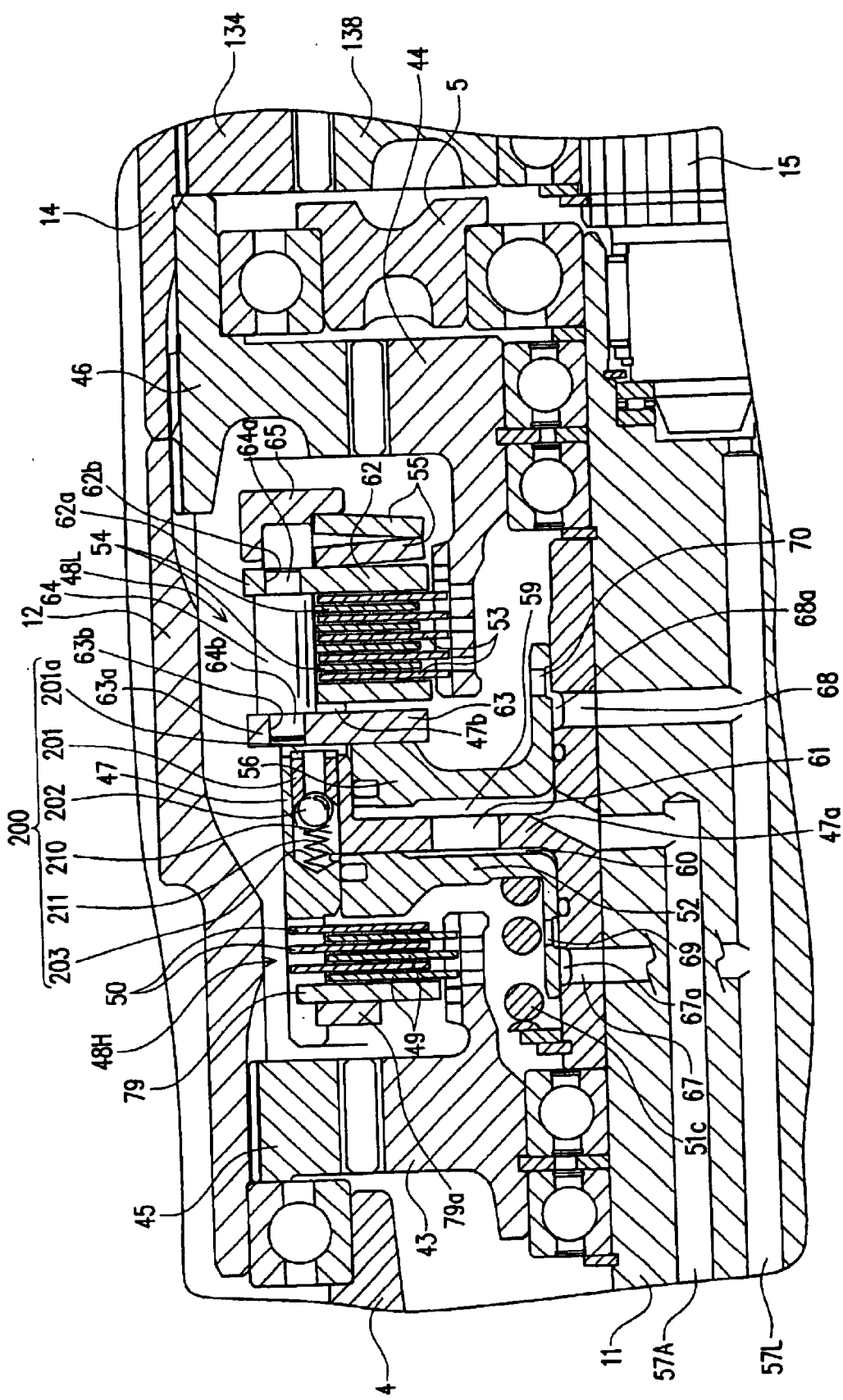
FIG. 4 is an enlarged view of the front housing of the tractor of FIG. 1 in longitudinal cross section, illustrating a clutch engaged state of the spring-drive hydraulic clutch assembly.

As clearly illustrated in FIGS. 3 and 4, the high-speed hydraulic clutch 48H is of a hydraulic-drive, multi-disk friction clutch, which includes a first group of friction elements 49 relatively non-rotatably and axially slidably supported on a boss of the gear 43, a second group of friction elements 50, which are alternately arranged with the first group of friction elements 49 and relatively non-rotatably supported on the clutch cylinder 47 in such a manner as to be slidable along the clutch axis, piston 52 disposed opposite to the groups of friction elements 49, 50, return spring 51 for biasing the piston 52 away from the groups of friction elements 49, 50, and pressure receiving disk 79 disposed on the opposite side of the piston 52 with the groups of friction elements 49, 50 therebetween, in which the positioning of the pressure receiving disk 79 in the axial direction of the clutch is limited by stopper ring 79a. The thus arranged high-speed hydraulic clutch 48H achieves clutch engagement by means of hydraulic pressure, which moves the piston 52, which is biased by the return spring 51, towards the groups of friction elements 49, 50, which causes engagement of the groups of friction elements 49, 50 placed between the piston 52 and the pressure receiving disk 79.

The high-speed hydraulic clutch 48H in the high/low speed switching unit as illustrated is provided with check valve 200 for preventing simultaneous engagement of the high-speed hydraulic clutch 48H and the low-speed hydraulic clutch 48L due to movement of the piston 52 towards the groups of friction elements 49, 50, which movement is caused by kinetic pressure resulting from centrifugal action of hydraulic fluid present in a pressure receiving chamber of the piston 52 (hereinafter sometimes referred to centrifugal kinetic pressure) under an off-state of the high-speed hydraulic clutch 48H.

The check valve 200 is installed in valve hole 210, which is formed in an outer circumferential wall of the clutch cylinder 47 and extending along the axial direction of the clutch in such a manner as to be open to cutaway portions 47c formed in the clutch cylinder 47.

Specifically, the check valve 200, as illustrated in FIG. 3, includes sleeve 201 fitted in the valve hole 210, ball 202 resting on a valve seat formed on an inner end surface of the sleeve 201, and spring 203 for pressing the ball 202 towards the valve seat of the sleeve 201.

The sleeve 201 forms therein a central hole extending between an inner end surface of its side for being inserted into the valve hole 210 and an outer end surface of its opposite side projecting towards the cutaway portions 47c, and split-like fluid escape groove 201a, which is formed on the outer end surface of the sleeve and extends radially for communication between the central hole and the cutaway portions 47c. During the ball 202 rests on the valve seat formed on the inner end surface of the sleeve 201, an end of the central hole closer to the inner end surface is covered by the ball 202.

The clutch cylinder 47 also forms thereon annular groove 211 for shutting off the communication between the inside of the valve hole 210 and the pressure receiving chamber of the piston 52 when the piston 52 lies at the farthest position away from the groups of friction elements 49, 50, and achieving the communication between the inside of the valve hole 210 and the pressure receiving chamber of the piston 52 when the piston 52 has moved from the farthest position towards the groups of friction elements 49, 50.

In this embodiment, six cutaway portions 47c are formed along the circumference of the clutch cylinder 47 with equal spacing. In this arrangement, it is enough to provide at least one check valve 200 in any one of the cutaway portions. The thus arranged check valve 200 produces the effects as described below.

That is, upon receiving the effect of the centrifugal kinetic pressure, the piston 52 of the high-speed hydraulic clutch 48H in the clutch-off state (see FIG. 3) slightly moves away from the farthest position towards the groups of friction elements 49, 50, thereby enabling the communication between the inside of the valve hole 210 and the pressure receiving chamber of the piston 52 via the annular groove 211. The kinetic pressure resulting from the centrifugal action also acts on the ball 202, so that the ball 202 moves away from the valve seat of the sleeve 201 towards the radially outward side.

That is, when the piston 52 moves from the farthest position towards the groups of friction elements 49, 50 by means of the kinetic pressure resulting from the centrifugal action, the ball 202 moves away from the valve seat of the sleeve 201 towards the radially outward side (chain lines in FIG. 3), thereby enabling the inside of the valve hole 210 to be brought into communication with the central hole of the sleeve 201.

Accordingly, the centrifugal kinetic pressure acting on the piston 52 is escaped to a fluid reservoir of the front housing 1 via the annular groove 211, the valve hole 210, the central hole of the sleeve 201, the escape groove 201a of the sleeve 201 and the cutaway portions 47c, thus preventing the groups of friction elements 49, 50 from being engaged with each other due to the extended movement of the piston 52.

When hydraulic pressure acts on the piston 52 by the displacement of direction-switching electromagnetic valve 76 to position II, the ball 202 is instantly returned to a position illustrated in solid line in FIG. 3 by means of the hydraulic pressure, at which the ball 202 rests on the valve seat of the sleeve 201. Thus, loss of the hydraulic pressure acting on the piston 52 is prevented.

As clearly illustrated in FIGS. 3 and 4, the low-speed hydraulic clutch 48L is of a spring-drive, multi-disk friction clutch, which includes a first group of friction elements 53 relatively non-rotatably supported on a boss of the gear 44 in such a manner as to be slidable along the axis of the clutch, a second group of friction elements 54, which are alternately arranged with the first group of friction elements 53 and relatively non-rotatably supported on the clutch cylinder 47 in such a manner as to be slidable along the axis of the clutch, conical springs 55 for pressing both the groups of friction elements 53, 54 into frictional engagement with each other, and piston 56 for releasing both the groups of friction elements 53, 54 from their frictional engagement against biasing force of the conical springs 55. The thus arranged low-speed hydraulic clutch 48L achieves clutch engaged state through frictional engagement of both the groups of friction elements 53, 54, which are moved to each other by the biasing force of the two conical springs 55, as illustrated in FIG. 4, and clutch disengaged state as illustrated in FIG. 3 by the effect of hydraulic pressure, which moves the piston 56 disposed in the clutch cylinder 47 in such a direction as to release the groups of friction elements 53, 54 from the frictional engagement, as described below.

As illustrated in FIGS. 2–4, the driving shaft 11 forms therein common operational fluid passage 57A for the high-speed and low-speed hydraulic clutches 48H, 48L, and lubricant passage 57L for the hydraulic clutches 48H, 48L, which are bored through a front end surface of the driving shaft 11. Bored ends of these passages are covered by plug members. These passages 57A, 57L are connected with fluid passages on the fixed side of the clutch assembly by fluid-passage rotary joints 58A, 58L, each of which is made up of an annular recess formed on the outer circumference of the driving shaft 11 and bearing frame member 4, which surrounds the annular recess, as illustrated in FIG. 2.

The clutch cylinder 47 has partition wall 47a at the center along the longitudinal direction, in which the pistons 52, 56 of the hydraulic clutches 48H, 48L are disposed on the opposite sides with the partition wall 47a therebetween. The operational fluid passage 57A is open to hydraulic fluid chamber 59 defined by the partition wall 47a and the piston 56 of the hydraulic clutch 48L. The partition wall 47a also forms therein fluid passage hole 61 for communication between the hydraulic fluid chamber 59 and hydraulic fluid chamber 60 defined by the partition wall 47a and the piston 52 of the hydraulic clutch 48H.

Figure 5:
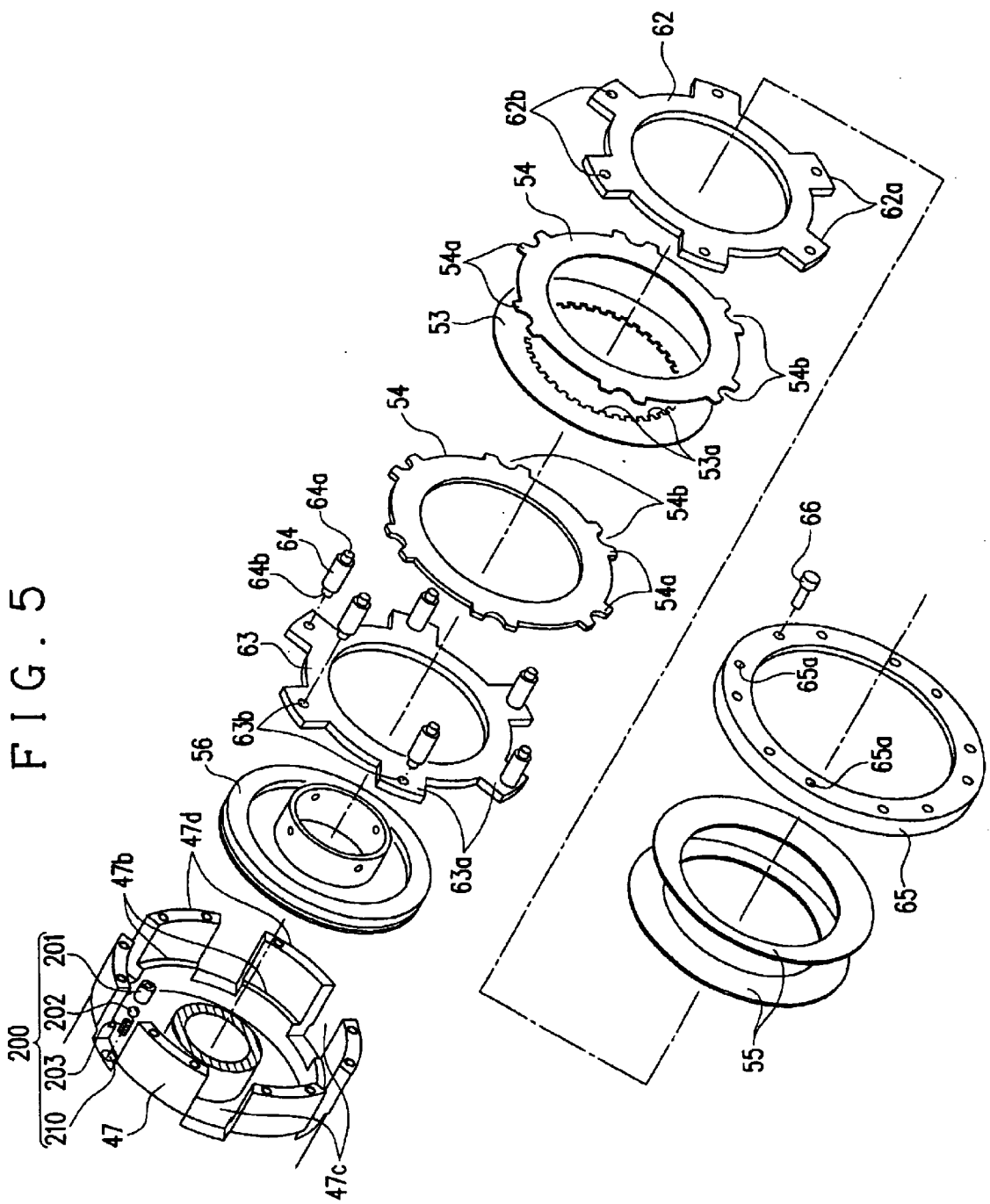
FIG. 5 is an exploded perspective view, illustrating the spring-drive hydraulic clutch of FIGS. 2–4.
Figure 6:
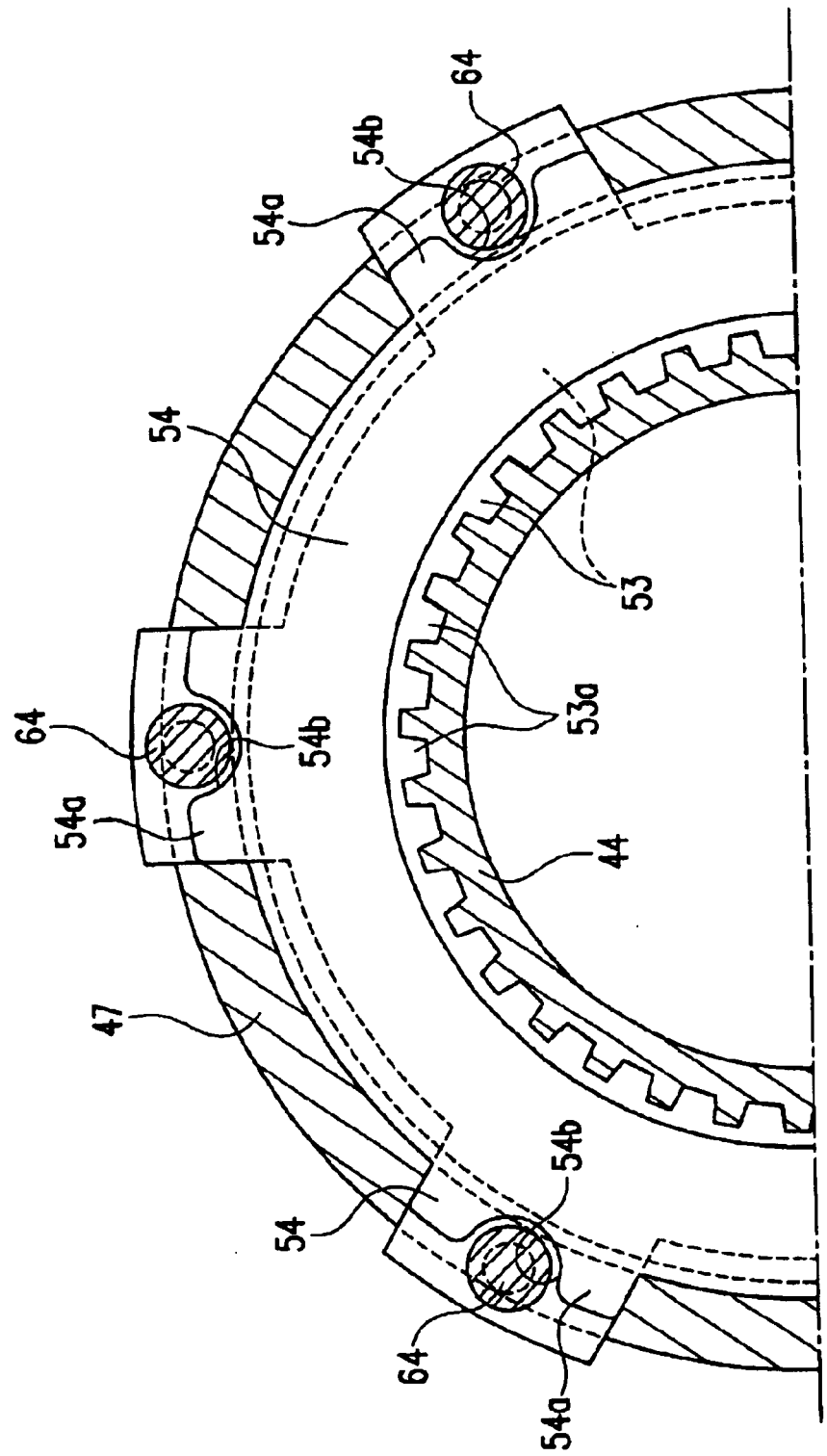
FIG. 6 is a front view of a half of the spring-drive hydraulic clutch in lateral cross section.

Now, the description will be made for the detailed structure of the low-speed hydraulic clutch 48L with reference to mainly FIGS. 3–6. FIG. 5 is an exploded perspective view of the low-speed hydraulic clutch 48L, which is illustrated as having a smaller number of friction elements in the groups 53, 54 than the actual number. FIG. 6 is a front view of a half of the hydraulic clutch 48H, 48L in lateral cross section.

Of the friction elements in the second group 54 supported on the clutch cylinder 47, only the forefront friction element, which is closest to the piston 56, is formed slightly thicker than the residual friction elements. As illustrated in FIG. 5, the clutch cylinder 47 has an inner circumference, which forms thereon pressure receiving face 47b which the forefront friction element 54 contacts when in the clutch engaged state, and a peripheral wall forming the cutaway portions 47c extending from a free end thereof. The groups of friction elements 53, 54 are disposed between ring-like pressure disk 62 positioned closer to the conical springs 55 and ring-like operation disk 63 positioned closer to the piston 56. On the outer circumferences of these pressure disk 62 and operation disk 63 are formed a plurality of engaging protrusions 62a, 63a, which respectively form at their centers holes 62b, 63b and are respectively fitted in the cutaway portions 47c of the clutch cylinder 47. On the outer circumferences of the second group of friction elements 54 supported on the clutch cylinder 47 are formed a plurality of engaging protrusions 54a, which respectively form grooves 54b at their centers and are respectively fitted in the cutaway portions 47c of the clutch cylinder 47. The pressure disk 62 is connected with the operation disk 63 via a plurality of interlocking rods 64, which are inserted through the holes 62b of the pressure disk 62 and the holes 63b of the operation disk 63, in such a manner as not to be relatively moved to each other. Specifically, the interlocking rods 64 respectively have diametrically smaller portions 64a, 64b, which are respectively inserted in the holes 62b of the pressure disk 62 and the holes 63b of the operation disk 63. Center portions of the interlocking rods 64 between these diametrically smaller portions 64a and 64b pass through the grooves 54b of the friction elements 54, as illustrated in FIGS. 3, 4 and 6.

On the inner circumference of each friction elements in the first group 53 supported on the gear 44 is formed spline teeth 53a, which are meshed with spline teeth formed on the boss of the gear 44. The conical springs 55 are interposed between the pressure disk 62 and spring-receiving ring 65 spaced apart from the pressure disk 62. More specifically, the spring-receiving ring 65 forms therein holes 65a, and the clutch cylinder 47 forms on its free end threaded holes 47b respectively facing the holes 65a. The spring-receiving ring 65 is connected with the clutch cylinder 47 by a plurality of bolts 66, which are inserted through the holes 65a and threaded into the threaded holes 47b.

According to the above arrangement, when pressurized fluid is not fed into the operational fluid passage 57A (FIG. 4), the high-speed hydraulic clutch 48H is held in the clutch released state upon receiving biasing force of the return spring 51. On the other hand, in the low-speed hydraulic clutch 48L, biasing force of the conical springs 55 forces the pressure disk 62 towards the clutch cylinder 47, thereby pressing the groups of friction elements 53, 54 into engagement with each other between the pressure disk 62 and the pressure receiving face 47b of the clutch cylinder 47. Accordingly, the low-speed hydraulic clutch 48 is brought into the clutch engaged state. Thus, with no application of hydraulic pressure, the high-speed hydraulic clutch 48H is held in the disengaged state, while the low-speed hydraulic clutch 48L is held in the engaged state.

On the contrary, when pressurized fluid is fed into the operational fluid passage 57A (FIG. 3), the high-speed hydraulic clutch 48H has the piston 52 press the groups of friction elements 53, 54 into engagement with each other against biasing force of the return spring 51, thus bringing itself into the engaged state. On the other hand, the low-speed hydraulic clutch 48L has the piston 56 press the operation disk 63. As described above, since the pressure disk 62 is connected with the operation disk 63 via the interlocking rods 64 in such a manner as not to move in the axial direction of the clutch, the movement of the operation disk 63 causes the pressure disk 62 to move away from the groups of friction elements 53, 54 while compressing the conical springs 55. Accordingly, the frictional engagement between the groups of friction elements 53, 54 is released, thereby releasing the low-speed hydraulic clutch 48L from the engaged state. Thus, by the application of hydraulic pressure, the high-speed hydraulic clutch is held in the engaged state, while the low-speed hydraulic clutch 48L is held in the disengaged state.

As illustrated in FIGS. 3 and 4, the lubricant passage 57L within the driving shaft 11 is open to the groups of friction elements 49, 50, and 53, 54 through holes 67, 68 formed in a boss of the clutch cylinder 47, and holes 69, 70 formed in the inner circumferences of the pistons 52, 56. More specifically, the holes 67, 68 are respectively accompanied by annular grooves 67a, 68a open through the outer circumference of the boss of the clutch cylinder 47.

Meanwhile, since the clutch cylinder 47 is prevented from moving in the axial direction of the clutch, while the pistons 52, 56 are allowed to move in that direction, a communication area in cross section between the holes 67, 69 and a communication area in cross section between the holes 68, 70 are varied according to the moved positions of the pistons 52, 56. In this embodiment, the lubricant is effectively utilized by the following arrangement.

That is, when in the state as illustrated in FIG. 3, it is so designed that the communication area in cross section between the holes 67, 69 is increased, while the communication area in cross section between the holes 68, 70 is greatly reduced. On the contrary, when in the state as illustrated in FIG. 4, it is so designed that the communication area in cross section between the holes 67, 69 is greatly reduced, while the communication area in cross section between the holes 68, 70 is increased. This arrangement allows a large amount of lubricant to be fed to a hydraulic clutch with its friction elements held in the engaged state (i.e., the hydraulic clutch 48H in FIG. 3 and the hydraulic clutch 48L in FIG. 4), and limits the feeding of lubricant to a hydraulic clutch with its friction elements held out of the engaged state (i.e., the hydraulic clutch 48L in FIG. 3 and the hydraulic clutch 48H in FIG. 4). Thus, efficient utilization of lubricant can be achieved.

Figure 7:
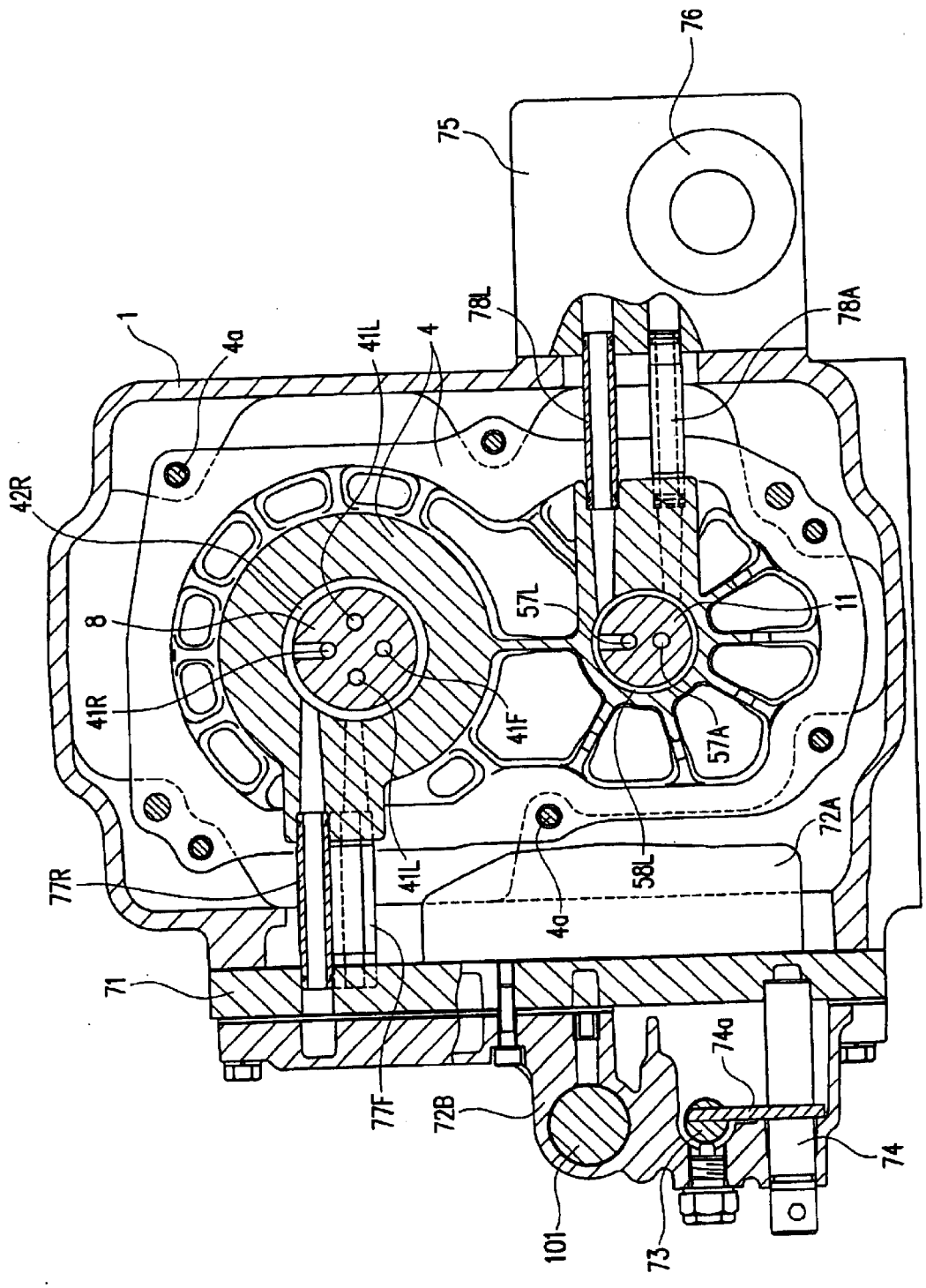
FIG. 7 is a rear view of the front housing in lateral cross section.
Figure 8:
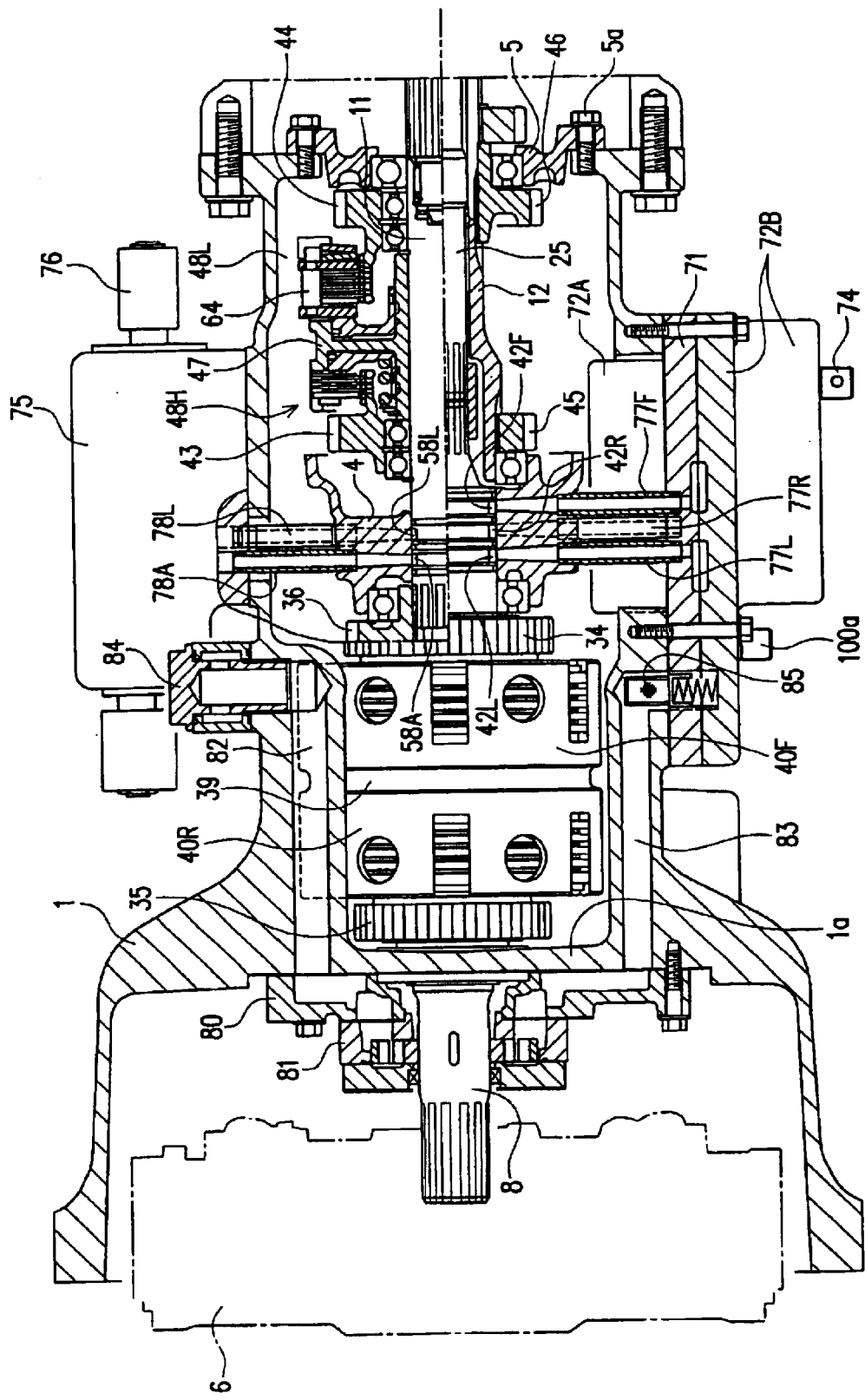
FIG. 8 is a plan view of the front housing in longitudinal cross section with its rear side having upper and rear parts sectioned along different planes.

FIG. 7 is a rear view of the front housing in lateral cross section. FIG. 8 is a plan view of the front housing in longitudinal cross section with its rear side having an upper part taken along the center line of the driving shaft 11 and a lower part taken along the center line of the driven shaft 12.

As illustrated in FIGS. 7 and 8, plate member 71 is attached on an outer side of a first wall of the front housing 1, and has inner and outer sides with valve housings 72A, 72B respectively mounted thereon. These valve housings 72A, 72B accommodate valves associated with the forward/rearward movement switching unit 10. These valves include direction switching valve 73 for performing switching operation of feeding and discharging hydraulic pressure with respect to the hydraulic clutches 40F, 40R for forward and rearward movements. This direction switching valve 73 is operated by arm 74a on rotation operation shaft 74 supported by the plate member 71 and the valve housing 72B. Valve housing 75 is attached on an outer side of a second wall of the front housing 1. The valve housing 75 accommodates valves associated with the high/low speed switching unit 13. These valves include the direction-switching electromagnetic valve 76 for performing switching operation of feeding and discharging hydraulic pressure with respect to the high-speed and low-speed hydraulic clutches 48H, 48L of the high/low speed switching unit 13.

The rotary joints 42F, 42R, 42L are connected with the plate member 71 and the insides of the valve housings 72A, 72B via laterally extending fluid passage within the bearing frame member 4 and pipes 77F, 77R, 77L. Likewise, the rotary joints 58A, 58L on the outer circumference of the driving shaft 11 are connected with the inside of the valve housing 75 via a laterally extending fluid passage within the bearing frame member 4 and pipes 78A, 78L.

As illustrated in FIGS. 2 and 8, plate member 80 is attached on a front side of the support wall 1a of the front housing 1. Gear-type hydraulic pump 81 with the motive shaft 8 acting as a pump shaft thereof is attached on a front side of the plate member 80. As illustrated in FIG. 8, the first wall of the front housing 1 defines inlet passage 82 of hydraulic pump 81, while the second wall of the front housing 1 defines outlet passage 83. The inlet passage 82 has a proximal end to which port-forming member 84 is mounted, while the outlet passage 83 is connected with the insides of the valve housings 72A, 72B via fluid strainer 85.

Figure 10:
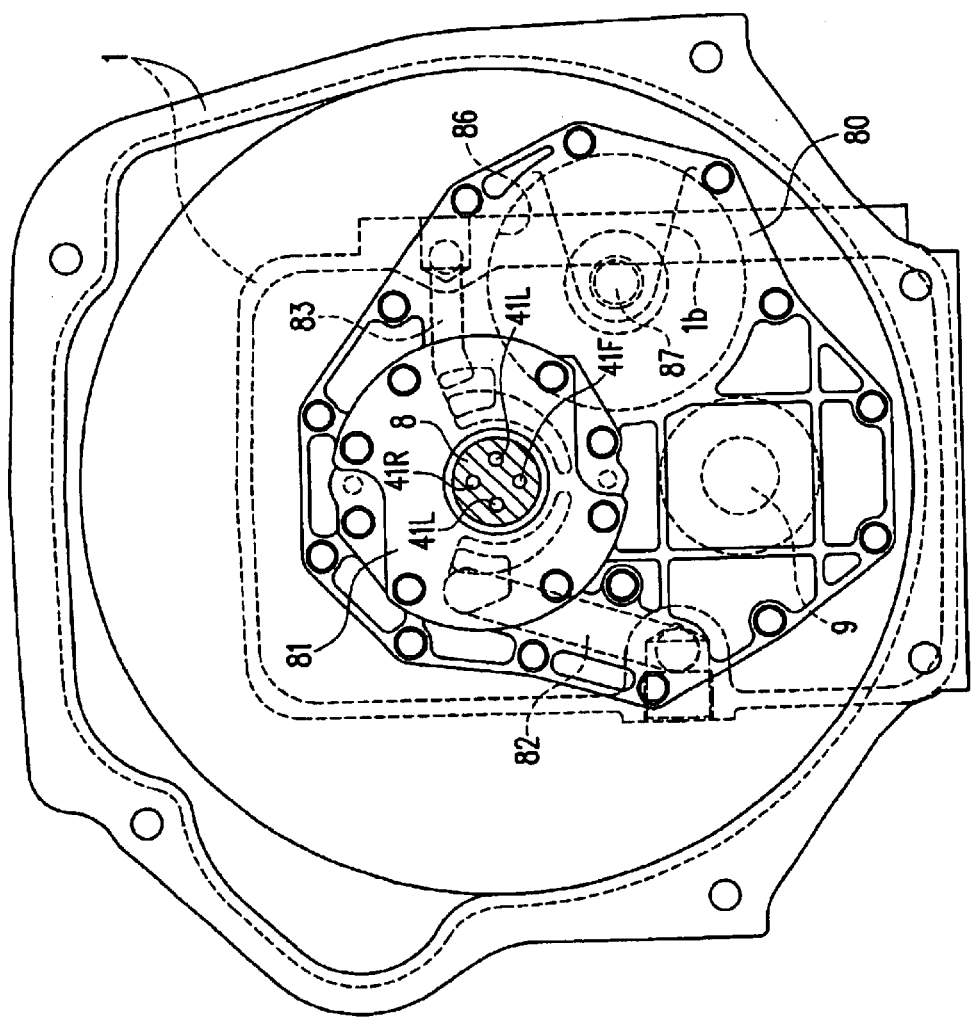
FIG. 10 is a front view of a portion of the front housing in lateral cross section with an engine flywheel removed.

FIG. 9 is a plan view in longitudinal cross section, illustrating a portion of the front housing. FIG. 10 is a front view of a portion of the front housing in lateral cross section with an engine flywheel removed.

As illustrated in FIGS. 9 and 10, the support wall 1a defines opening 86, through which an idler gear is incorporated. The idler gear 38 is mounted on support shaft 87 supported by support protrusion 1b on an inner side of the front housing 1 and the plate member 80.

Figure 11:
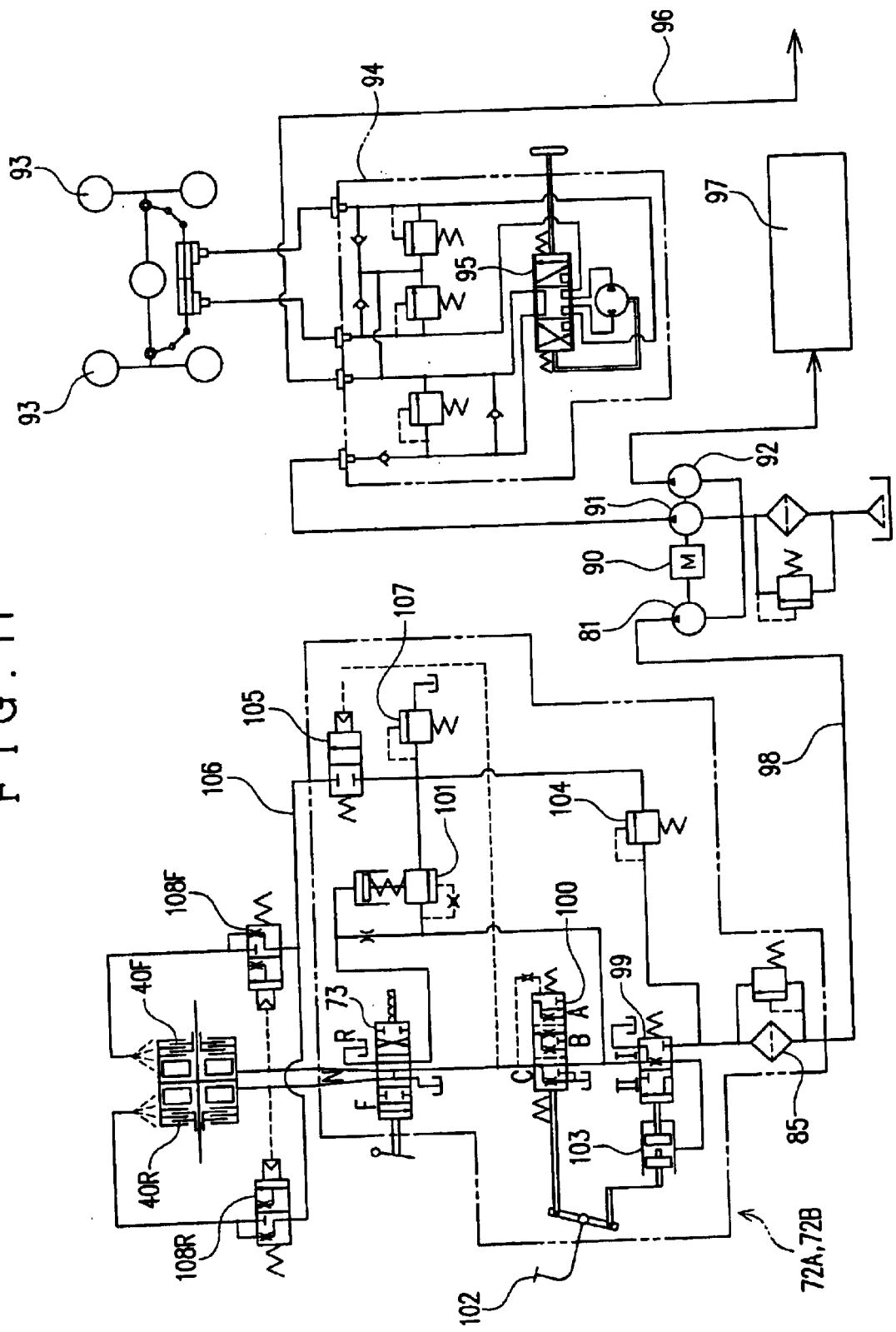
FIG. 11 is a hydraulic circuit diagram illustrating a part of a hydraulic circuit in the tractor.
Figure 12:
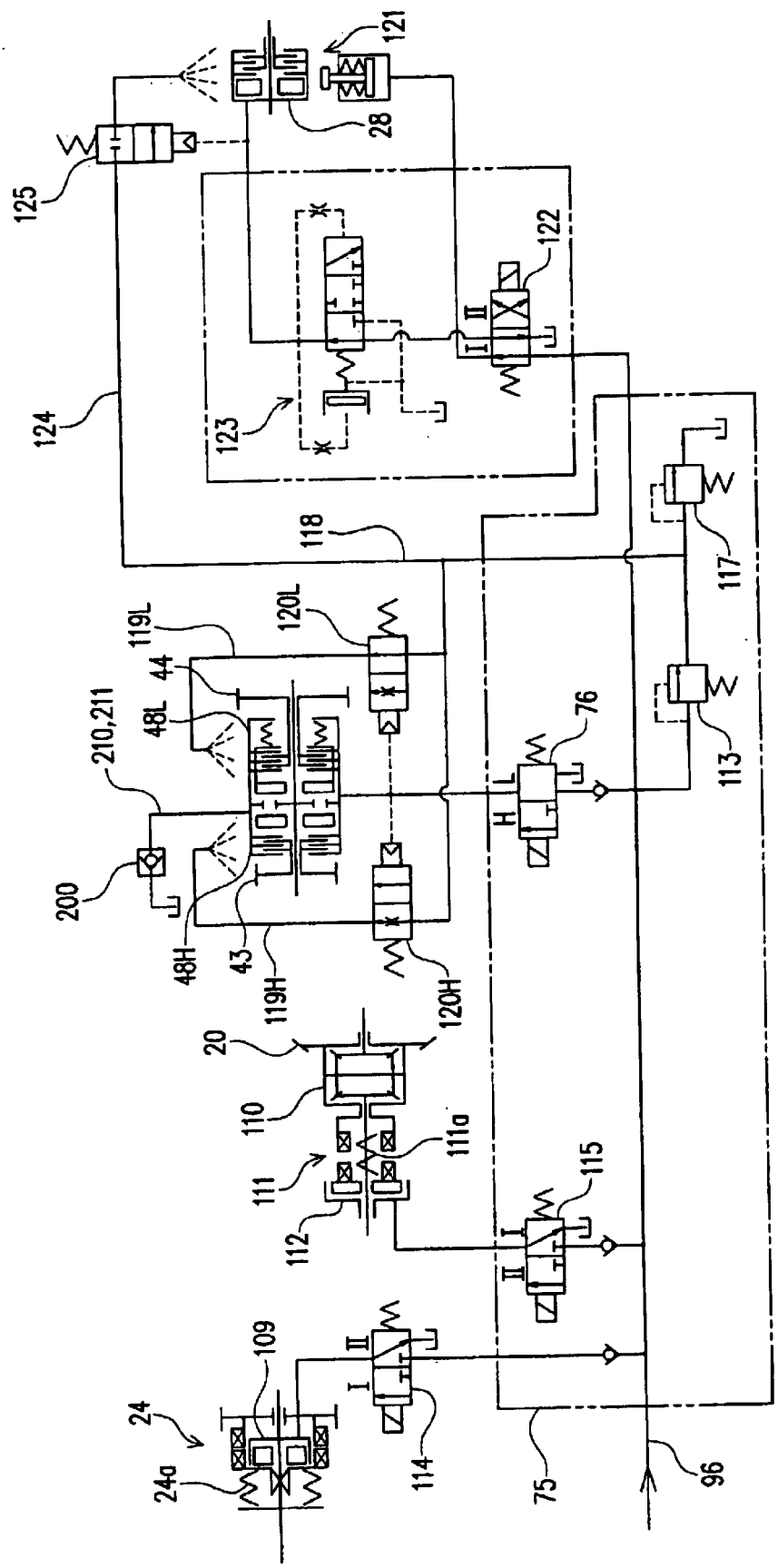
FIG. 12 is a hydraulic circuit diagram illustrating the residual part of the hydraulic diagram, which follows the part of the hydraulic circuit of FIG. 11.

Now, the description will be made for a valve mechanism mounted in the tractor. FIG. 11 is a hydraulic circuit diagram illustrating a part of a hydraulic circuit in the tractor. FIG. 12 is a hydraulic circuit diagram illustrating the residual part of the hydraulic circuit, which is connected with the part of the hydraulic circuit of FIG. 11.

As illustrated in FIG. 11, the tractor includes the hydraulic pump 81 driven by engine 90 and two other hydraulic pumps 91, 92. Of these pumps, the hydraulic pump 81 feeds pressurized fluid to a hydraulic pressure mechanism, which includes the hydraulic clutches 40F, 40R of the forward/rearward movement switching unit 10.

The hydraulic pump 91 feeds pressurized fluid to switching valve 95 of power steering mechanism 94 for pivotally moving the right and left front wheels 93, while feeding the residual fluid to the hydraulic clutches 48H, 48L of the high/low speed switching unit 13 as illustrated in FIG. 12, and other parts. The hydraulic pump 92 feeds pressurized fluid to drive circuit 97 of an outside actuator attached to the tractor.

First, the hydraulic mechanism of the forward/rearward movement switching unit 10 will be briefly explained. As illustrated in FIG. 11, outlet circuit 98 of the hydraulic pump 81, in which the fluid strainer 85 is inserted, is connected with the hydraulic clutches 40F, 40R via fluid passage shut-down valve 99, pressure reducing valve 100 and the direction switching valve 73.

The fluid passage shut-down valve 99 takes passage shut-down position I and release position II, in which it drains fluid through a connection circuit between the fluid passage shut-down valve 99 and the pressure reducing valve 100 when in the shut-down position I.

The pressure reducing valve 100 is to perform pressure reducing operation for the hydraulic pressure within the circuit led towards the switching valve 73, and takes non-actuation position A enabling connection between the fluid passage shut-down valve 99 and the switching valve 73 without substantial throttling, pressure reducing position B enabling adjustable pressure reduction of the hydraulic pressure within the aforesaid circuit by means of adjustable throttling operation, and unload position C enabling drainage of hydraulic fluid from the aforesaid circuit.

The switching valve 73 takes neutral position N, forward-movement position F bringing the hydraulic clutch 40F for forward movement into engaged state, and rearward-movement position R bringing the hydraulic clutch 40R for rearward movement into engaged state.

A connection circuit between the fluid passage shut-down valve 99 and the pressure reducing valve 100 is connected with modulating relief valve 101 of a known type for gradually increasing operating hydraulic pressure with respect to the hydraulic clutches 40F, 40R from the time at which the switching valve 73 has been shifted to the position F or R. This relief valve 101 is installed within the valve housing 72B, as illustrated in FIG. 7.

The pressure reducing valve 100 of the tractor is designed to be operated by means of pedal 102. The tractor also includes cylinder mechanism 103 for mechanically shifting the fluid passage shut-down valve 99 from the shut-down position I to the release position II in association with this pressure reducing operation.

The cylinder mechanism 103 is designed so that, even if the pedal 102 is returned to the original position, the fluid passage shut-down valve 99 is stayed at the release position II, once it is shifted to the release position II, by means of hydraulic pressure of the connection circuit between the fluid passage shut-down valve 99 and the pressure reducing valve 100, which pressure acts via the fluid passage shut-down valve 99.

According to the above arrangement, in a vehicle stopped state, the pressure reducing valve 100 is shifted to the unload position C and the fluid passage shut-down valve 99 is simultaneously shifted to the release position II by greatly pressing down the pedal 102. The pressure reducing valve 100 is then returned to the non-actuation position through the pressure reducing position B by gradually returning the pedal 102, so that the vehicle gradually starts moving. In a vehicle moving state, the pedal 102 is pressed down by an arbitrary amount, thereby enabling the pressure reducing valve 100 to achieve a pressure reducing state to an arbitrary extent, while simultaneously holding the fluid passage shut-down valve 99 at the release position II. Accordingly, the vehicle can move at a relative low speed through slipping engagement of the hydraulic clutch 40F or 40R, either in the engaged state.

Relief fluid of the modulating relief valve 101 flows into a relief circuit of main relief valve 104 for setting the hydraulic pressure of the circuit 98. Interposed in this relief circuit with the relief fluid flown thereinto is open/close valve 105 which is opened by means of hydraulic pressure on the downstream side of the pressure reducing valve 100. Whereby, lubricant feeding circuit 106 from the open/close valve 105 to the hydraulic clutches 40F, 40R can be formed, in which the hydraulic pressure of lubricant is set by means of relief valve 107. In a circuit leading the lubricant feeding circuit 106 to the respective hydraulic clutches 40F, 40R is provided flow-rate control valves 108F, 108R for increasing the flow rate of lubricant only during the clutches are in operation, based upon the moved position of the piston 40b (see FIG. 2).

The above described valves for the forward/rearward movement switching unit 10 are placed within the valve housings 72A, 72B as illustrated in FIGS. 7 and 8. Operational part 100a for the pressure reducing valve 100 as illustrated in FIG. 11 projects outward through the valve housing 72B, as illustrated in FIG. 8.

Circuit 96 from the power steering mechanism 94 is employed to feed pressurized fluid to the hydraulic clutches 48H, 48L in the high/low speed switching unit 13, as well as feed pressurized fluid to hydraulic cylinder 109 (see FIG. 1) for operation of the front wheel driving clutch 24, hydraulic cylinder 112 for operation of differential lock clutch 111 provided adjacent to differential unit 110 for the right and left rear wheels, and the PTO clutch 28 (see FIG. 1), respectively. The hydraulic pressure of the circuit 96 is set by means of relief valve 113.

As illustrated in FIG. 12, the front wheel driving clutch 24 includes switching valve 114, which takes clutch-off position I and clutch-in position II, and is designed to be usually held in an engaged state by the effect of spring 24a and released from the engaged state upon by having hydraulic pressure acting on the hydraulic cylinder 109.

The differential lock clutch 111 includes switching valve 115, which takes clutch-off position I and clutch-in position II, and is designed to be usually held in an engaged state by the effect of spring 111a and is released from the engaged state by having hydraulic pressure acting on the hydraulic cylinder 112.

As described above, the high/low speed switching unit 13 is designed so that when having hydraulic pressure acting on the hydraulic clutches 48H, 48L, the high-speed hydraulic clutch 48H is brought into the engaged state while the low-speed hydraulic clutch 48L is released from the engaged state, and when having hydraulic pressure released from the hydraulic clutches 48H, 48L, the high-speed hydraulic clutch 48H is released from the engaged state while the low-speed hydraulic clutch 48L is brought into the engaged state.

As illustrated in FIG. 12, the direction-switching electromagnetic valve 76 takes high-speed position H enabling feeding of pressurized fluid to the high-speed hydraulic clutch 48H and the low-speed hydraulic clutch 48L, respectively, and low-speed position L enabling shut-down of feeding of pressurized fluid to the high-speed hydraulic clutch 48H and the low-speed hydraulic clutch 48L, respectively, and bringing the low-speed hydraulic clutch 46 into the engaged state.

On the downstream side of the relief valve 113 is provided relief valve 117 for setting the hydraulic pressure of lubricant. Specifically, lubricant feeding circuit 118 for the hydraulic clutches 48H, 48L is branched off from a line between the relief valves 113 and 117. This lubricant feeding circuit 118 is lead to the hydraulic clutches 48H, 48L respectively via circuits 119H, 119L.

The circuits 119H, 119L are respectively provided with flow-rate control valves 120H, 120L for controlling the feeding rate of lubricant according to the moved positions of the pistons 52, 56, as described above with reference to FIGS. 3 and 4.

As illustrated in FIG. 12, disposed on the side of the PTO clutch 28 is brake 121 for braking a clutch driven side in association with the off-state of the clutch 28. Direction-switching electromagnetic valve 122 for the PTO clutch 28 takes clutch-off position I actuating the brake 121 while disengaging the PTO clutch 28, and clutch-in position II releasing the brake 121 out of the operational state while engaging the PTO clutch 28.

Modulating relief valve or shockless valve 123 with its detailed description omitted is interposed in a connection circuit between the directional switching valve 122 and the PTO clutch 28, which valve 123 enables operational fluid to be gradually fed to the PTO clutch 28 from the time at which the directional switching valve 122 has been shifted to the clutch-in position II, and hence achieves shockless engagement of the clutch 28. The lubricant feeding circuit 118 is designed to feed lubricant to the PTO clutch 28, too. Specifically, the lubricant feeding circuit 118 is communicated with the PTO clutch 28 via circuit 124. Interposed in the circuit 124 is open/close valve 125, which feeds lubricant to the PTO clutch 28 only during the PTO clutch 28 lies in the clutch-in state.

Now, the residual parts of the illustrated transmission will be summarized.

The main-speed-change unit 16 includes four gears 133, 134, 135, 136 fixedly mounted on the driving shaft 14, and four gears 137, 138, 139, 140 rotatably mounted on the driven shaft 15, as illustrated in FIG. 1. The fixedly mounted gears 133–136 are respectively meshed with the rotatably mounted gears 137–140.

The main-speed-change unit 16 also includes two synchronous clutches of multiple type 141, 142 disposed on the driven shaft 15 so as to be respectively positioned between the gears 137, 138 and between the gears 139, 140. The gears 137–140 are selectively engaged with the driven shaft 15, so that four speed stages can be obtained.

As illustrated in FIG. 1, the sub-speed-change unit 19 includes gear trains 144, 145 for connection between the driven shaft 15 and the counter shaft 17 with its speed reduced from the driven shaft 15 to the counter shaft 17, two gears 146, 147 fixedly mounted on the counter shaft 17, gear 149 connected with the gear 147 having a smaller diameter via speed reducing gear mechanism 148 and supported on a portion other than the counter shaft 17, shift gear 150 relatively non-rotatable and axially slidable with respect to the propeller shaft 18 so as to be selectively meshed with the gears 149, 147, gear 151 rotatably mounted on the propeller shaft 18 so as to be meshed with the gear 146, and multiple clutch 152 operated so as to take a position enabling the gear 151 to be coupled with the propeller shaft 18, and a position enabling the propeller shaft 18 to be directly coupled with the driven shaft 15, and a neutral position.

The thus arranged sub-speed-change unit 19 enables the propeller shaft 19 to rotate selectively at speeds respectively corresponding to a first speed stage achieved by the meshed engagement between the gears 149, 150 with the multiple clutch 152 lying in the neutral position, a second speed stage achieved by the meshed engagement between the gears 147 and 150 with the multiple clutch 152 lying in the neutral position, a third speed stage achieved by coupling the propeller shaft 18 with the gear 151 by means of the multiple clutch 152, and a fourth speed stage achieved by the direct connection of the propeller shaft 18 with the driven shaft 15 by means of the multiple clutch 152.

The mechanical speed change operation of the main-speed-change unit 16 or the sub-speed-change unit 18 disposed in the intermediate housing 2 is performed under the state where the pressure reducing valve 100 is shifted to the unload position C by the pedal 102 as illustrated in FIG. 11, and the running power transmission mechanism is shut off by the forward/rearward movement switching unit 10. The mechanical speed change operation of the PTO speed change unit 30 disposed in the rear housing 3 is performed under the state where the direction-switching electromagnetic valve 122 as illustrated in FIG. 12 is shifted to the clutch-off position I and the PTO power transmission train is shut off by means of the PTO clutch 28. Also, where the rotation of the PTO shaft 29 is to be stopped, the PTO clutch 28 is shut off in the same manner.

Thus, in the tractor as illustrated, the forward/rearward movement switching unit 10 also serves as a main clutch in the running system, and the PTO clutch 28 also serves a main clutch in the PTO system.

This specification is by no means intended to restrict the present invention to the preferred embodiments set forth therein. Various modifications to the hydraulic clutch assembly, as described herein, may be made by those skilled in the art without departing from the spirit and scope of the present invention as defined in the appended claims.

What is claimed is:

1. A hydraulic clutch assembly equipped with a spring-drive hydraulic clutch, said hydraulic clutch comprising:

a gear rotatably mounted on a transmission shaft and a clutch cylinder fixedly mounted on said transmission shaft;

a first group of friction elements respectively and relatively non-rotatably supported on said gear and said clutch cylinder in such a manner as to be slidable along an axis of the clutch;

a pressure disk disposed opposite to said first group of friction elements;

a spring for moving the pressure disk towards the first group of friction elements to bring the friction elements into engagement with each other;

a piston disposed in such a manner as to be slidable along the axis of the clutch on the opposite side of the pressure disk with the first group of friction elements therebetween, thereby forming a hydraulic fluid chamber within the clutch cylinder;

an operation disk disposed in such a manner as to be slidable along the axis of the clutch between the piston and the first group of friction elements; and an interlocking rod extending along the axis of the clutch for interlocking the operation disk with the pressure disk in such a manner as not to be relatively movable with respect to each other; wherein said pressure disk is moved away from the first group of friction elements through the operation disk and the interlocking rod by an effect of hydraulic pressure acting on the piston, so that the friction elements are released from engagement with each other;

the clutch cylinder forming cutaway portions in an outer circumferential wall thereof, said cutaway portions extending along the axis of the clutch;

the pressure disk and the operation disk respectively having protrusions which project into the cutaway portions of the clutch cylinder; and the interlocking rod interlocking the protrusion of the pressure disk with the protrusion of the operation disk.

2. A hydraulic clutch assembly according to claim 1, wherein:

said protrusions are engaging protrusions to be fitted in the cutaway portions so as to enable the pressure disk and the operation disk to be relatively non-rotatable with respect to the clutch cylinder.

3. A hydraulic clutch assembly according to claim 2, wherein:

the second friction element supported on the clutch cylinder has engagement protrusions formed on an outer circumference thereof and being respectively fitted into the cutaway portions so as to be relatively non-rotatable with respect to the clutch cylinder.

4. A hydraulic clutch assembly according to claim 1, wherein:

the second friction element supported on the clutch cylinder has engagement protrusions formed on an outer circumference thereof and being respectively fitted into the cutaway portions so as to be relatively non-rotatable with respect to the clutch cylinder.

5. A hydraulic clutch assembly equipped with a spring-drive hydraulic clutch, said hydraulic clutch comprising:

a gear rotatably mounted on a transmission shaft and a clutch cylinder fixedly mounted on said transmission shaft;

a first group of friction elements respectively and relatively non-rotatably supported on said gear and said clutch cylinder in such a manner as to be slidable along an axis of the clutch;

a pressure disk disposed opposite to said first group of friction elements;

a spring for moving the pressure disk towards the first group of friction elements to bring the friction elements into engagement with each other;

a piston disposed in such a manner as to be slidable along the axis of the clutch on the opposite side of the pressure disk with the first group of friction elements there between, thereby forming a hydraulic fluid chamber within the clutch cylinder;

an operation disk disposed in such a manner as to be slidable along the axis of the clutch between the piston and the first group of friction elements; and an interlocking rod extending along the axis of the clutch for interlocking the operation disk with the pressure disk in such a manner as not to be relatively movable with respect to each other; wherein said pressure disk is moved away from the first group of friction elements through the operation disk and the interlocking rod by an effect of hydraulic pressure acting on the piston, so that the friction elements are released from engagement with each other;

a hydraulic-drive hydraulic clutch;

said hydraulic-drive hydraulic clutch including;

a second gear rotatably mounted on the transmission shaft so as to be positioned opposite to the gear with the clutch cylinder therebetween;

a second group of friction elements, said first and second friction elements respectively supported on the second gear and the clutch cylinder in such a manner as to be slidable along the axis of the clutch and relatively non-rotatable thereto;

a second piston disposed opposite to said piston with a partition wall therebetween, said partition wall formed in the clutch cylinder, said second piston being slidable along the axis of the clutch; and a second spring for biasing said second piston away from the second group of friction elements; wherein the friction elements can be brought into an engaged state with each other by having hydraulic pressure acting on the second piston; and the transmission shaft forms a single operational fluid passage for feeding and discharging there through pressurized fluid to the hydraulic-drive hydraulic clutch and the spring-drive hydraulic clutch, respectively.

6. A hydraulic clutch assembly according to claim 5, wherein:

said single operational fluid passage is communicated with any one of hydraulic fluid chambers of the spring-drive hydraulic clutch and the hydraulic-drive hydraulic clutch; and the partition wall of the clutch cylinder forms therein a fluid passage hole for communication between both the hydraulic fluid chambers.

7. A hydraulic clutch assembly according to claim 6, wherein:

said transmission shaft forms therein a single lubricant passage for feeding lubricant to the first group of friction elements in the spring-drive hydraulic clutch and the second group of friction elements of the hydraulic-drive hydraulic clutch, respectively;

said piston and second piston respectively have inner circumferences, which form first and second hydraulic fluid passages for communication between the single lubricant passage and the inside of the clutch cylinder; and said first and second hydraulic fluid passages respectively define openings communicated with the single lubricant passage, said openings being widened when the first and second pistons are shifted to positions respectively bringing the first group of friction elements into the engaged state, and the second group of friction elements into the engaged state.

8. A hydraulic clutch assembly according to claim 5, wherein:

said transmission shaft forms therein a single lubricant passage for feeding lubricant to the first group of friction elements in the spring-drive hydraulic clutch and the second group of friction elements of the hydraulic-drive hydraulic clutch, respectively;

said piston and second piston respectively have inner circumferences, which form first and second hydraulic fluid passages for communication between the single lubricant passage and the inside of the clutch cylinder; and said first and second hydraulic fluid passages respectively define openings communicated with the single lubricant passage, said openings being widened when the first and second pistons are shifted to positions respectively bringing the first group of friction elements into the engaged state, and the second group of friction elements into the engaged state.

\* \* \* \* \*